(12) United States Patent
Bodkin

(10) Patent No.: US 8,174,694 B2
(45) Date of Patent: May 8, 2012

(54) HYPERSPECTRAL IMAGING SYSTEMS

(75) Inventor: Andrew Bodkin, Wellesley, MA (US)

(73) Assignee: Bodkin Design and Engineering LLC, Newton, MA (US)

( * ) Notice: Subject to any disclaimer, the term of this patent is extended or adjusted under 35 U.S.C. 154(b) by 1018 days.

(21) Appl. No.: 11/933,253

(22) Filed: Oct. 31, 2007

(65) Prior Publication Data

US 2010/0328659 A1 Dec. 30, 2010

Related U.S. Application Data

(60) Continuation-in-part of application No. 11/758,986, filed on Jun. 6, 2007, which is a continuation-in-part of application No. 11/437,085, filed on May 19, 2006, now abandoned, which is a continuation of application No. 11/220,016, filed on Sep. 6, 2005, now abandoned, which is a division of application No. 10/325,129, filed on Dec. 20, 2002, now Pat. No. 7,049,597.

(60) Provisional application No. 60/914,618, filed on Apr. 27, 2007, provisional application No. 60/607,327, filed on Sep. 3, 2004, provisional application No. 60/344,130, filed on Dec. 21, 2001.

(51) Int. Cl.
*G01J 3/28* (2006.01)
(52) U.S. Cl. ...................................... 356/328
(58) Field of Classification Search .................. 356/326
See application file for complete search history.

(56) References Cited

U.S. PATENT DOCUMENTS

| | | | |
|---|---|---|---|
| 3,698,812 A | 10/1972 | Nelson | |
| 4,175,844 A | 11/1979 | Glaser-Inbari | |
| 4,193,691 A * | 3/1980 | Fjarlie | 356/330 |
| 4,561,775 A | 12/1985 | Patrick et al. | |
| 4,708,420 A | 11/1987 | Liddiard | |
| 4,754,139 A | 6/1988 | Ennulat et al. | |
| 5,136,312 A | 8/1992 | Weaver et al. | |
| 5,168,528 A | 12/1992 | Field, Jr. | |
| 5,191,469 A | 3/1993 | Margolis | |
| 5,239,179 A | 8/1993 | Baker | |
| 5,583,340 A | 12/1996 | Grossman | |
| 5,760,398 A | 6/1998 | Blackwell et al. | |
| 5,763,882 A | 6/1998 | Klapper et al. | |
| 5,825,029 A | 10/1998 | Agnese et al. | |
| 5,841,574 A | 11/1998 | Willey | |
| 5,877,500 A | 3/1999 | Braig et al. | |
| 5,963,749 A | 10/1999 | Nicholson | |
| 6,178,346 B1 | 1/2001 | Amundson et al. | |
| 6,362,872 B1 | 3/2002 | Berdanier | |
| 6,444,984 B1 | 9/2002 | Lundgren et al. | |

(Continued)

OTHER PUBLICATIONS

Restriction Requirement, Related U.S. Appl. No. 10/325,129, filed Feb. 11, 2005.

(Continued)

*Primary Examiner* — Tarifur Chowdhury
*Assistant Examiner* — Abdullahi Nur
(74) *Attorney, Agent, or Firm* — Lathrop & Gage LLP

(57) ABSTRACT

Hyperspectral imaging system and methods that may be used for imaging objects in three-dimensions are disclosed. A cylindrical lens array and/or a slit array may be used to re-image and divide a field of view into multiple channels. The multiple channels are dispersed into multiple spectral signatures and observed on a two-dimensional focal plane array in real time. The entire hyperspectral data cube is collected simultaneously.

17 Claims, 19 Drawing Sheets

U.S. PATENT DOCUMENTS

| | | | |
|---|---|---|---|
| 6,549,828 | B1 | 4/2003 | Garrot et al. |
| 6,552,321 | B1 | 4/2003 | Mills |
| 6,665,116 | B1 | 12/2003 | Harvey et al. |
| 6,756,594 | B2 | 6/2004 | George et al. |
| 6,781,127 | B1 | 8/2004 | Wolff et al. |
| 6,795,241 | B1 | 9/2004 | Holzbach |
| 2001/0045516 | A1 | 11/2001 | Emanuel et al. |
| 2002/0047896 | A1* | 4/2002 | Basiji et al. ............... 348/61 |
| 2002/0135763 | A1* | 9/2002 | MacKinnon et al. ......... 356/326 |
| 2002/0180866 | A1 | 12/2002 | Monroe |
| 2003/0161533 | A1 | 8/2003 | Sunshine et al. |
| 2003/0174238 | A1 | 9/2003 | Wu |
| 2003/0202177 | A1 | 10/2003 | Reznichenko et al. |
| 2004/0090623 | A1 | 5/2004 | Richman |
| 2004/0119020 | A1 | 6/2004 | Bodkin |
| 2004/0238724 | A1 | 12/2004 | Moody et al. |
| 2004/0252992 | A1 | 12/2004 | Hunter |
| 2005/0023445 | A1 | 2/2005 | Horn et al. |
| 2005/0041144 | A1 | 2/2005 | Mitchell et al. |
| 2006/0044557 | A1* | 3/2006 | Vakhshoori et al. .......... 356/328 |

OTHER PUBLICATIONS

Response to Restriction Requirement, Related U.S. Appl. No. 10/325,129, filed Mar. 14, 2005.

Office Action, Related U.S. Appl. No. 10/325,129, filed Jun. 14, 2005.

Response to Office Action, Related U.S. Appl. No. 10/325,129, filed Oct. 14, 2005.

Notice of Allowance, Related U.S. Appl. No. 10/325,129, filed Dec. 29, 2005.

Office Action, Related U.S. Appl. No. 11/220,016, filed Apr. 11, 2007.

Office Action, Related U.S. Appl. No. 11/437,085, filed Aug. 11, 2006.

Response to Office Action, Related U.S. Appl. No. 11/437,085, filed Nov. 13, 2006.

Office Action, Related U.S. Appl. No. 11/437,085, filed Feb. 7, 2007.

Response to Office Action, Related U.S. Appl. No. 11/437,085, filed Aug. 7, 2007.

Notice of Allowance, Related U.S. Appl. No. 11/437,085, filed Oct. 1, 2007.

Sheinis,A.I. et al., "Integral Field Unit for the Echellete Spectrograph and Imager at Keck II", 4841 Proc. of SPIE, 1078-85 (2003).

Bacon R., et al., "3D Spectrography at High Spatial Resolution", 113 Astron. Astrophys. Suppl. Ser. 347-57 (1995).

Goetz, A.F.H. et al., Imaging Spectrometry for Earth Remote Sensing, Science, New Series, vol. 228, No. 4704 (Jun. 7, 1985), pp. 1147.

Content, R., "New Design for Integral Field Spectroscopy with 8-m Telescopes", 2871 Proc. of SPIE 1295-1305 (1997).

Martini et al., "Geological and geo-botanical characterization of a hydrothermal system using hyperspectral imagery analysis", 1 Proc. of the Thirteenth International Conference, Applied Geologic Remote Sensing, 337-341 (1999).

Sheinis,A.I.. et al., "ESI, a new Keck Observatory echellette spectrograph and imager", 114 Pub. Of Astronomical Society of the Pacific, 851-865 (2002).

Bach, "Atmospheric Correction of Hyperspectral Data in Terms of the Determination of Plant Parameters", 2318 Proc. of SPIE, 52.

Esplin et al., "SABER Instrument Design Update", 2553 Proc. of SPIE, 253-63 (1995).

Cayla et al., "IASA Instrument Overview", 2553 Proc. of SPIE, 316-328 (1995).

Kailey. W.F., et al., "Use of Hyperspectral Imagery for Broad-Area Detection of Small Targets", 2819 Proc, of SPIE, 15-23 (1996).

Willoughby, C.T. et al., "Application of Hyperspectral Imaging Spectrometer Systems to Industrial Inspection", 2599 Proc. of SPIE, 264.

Eismann, M.T. et al, "Target Detection in Desert Backgrounds", 2561 Proc. of SPIE, 80.

Bacon et al., "The Integral Field Spectrograph TIGER", 1988 vltt. Conf. 1185B.

Murguia, J.E. et al., "A Compact Visible/Near-infrared Hyperspectral Imager", 4028 Proc SPIE 457-468 (2000).

Ewing, B., et al., "Spectrometer Performance Comparison for the Characterization of Transient Events", obtained from link on internet archive dated Oct. 18, 2003, 8 pages.

Opto-Knowledge Systems, Inc. (2003) Website, http://www.techexpo.com/WWW/opto-knowledge/projmwlw4d-is.html; obtained from Internet archive dated Aug. 5, 2004, 2 pages.

Vanderriest, C. et al., "Astronomical uses of integral field spectrography: present applications at CFHT and future developments", 2198 SPIE 1376-1384 (1994).

Xing, Y. et al., "Hyperspectral Image Analysis using ENVI", 4383 Proc SPIE 79-86 (2001).

Sheinis et al., "Performance Characteristics of the new Keck Observatory echelle spectrograph and imager", 4008 Proc. SPIE, 522-533 (2000).

Fransden et al. "An Astronomical Seismometer", 279 Astron. Astrophys. 310-321 (1993).

Office Action issued in related U.S. Appl. No. 11/758,986, dated Sep. 2, 2010, 33 pages.

* cited by examiner

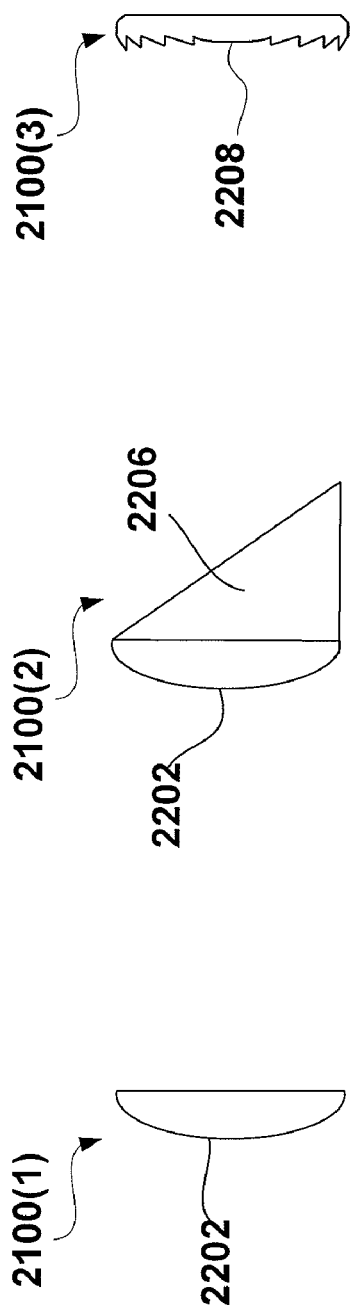

HYPERSPECTRAL IMAGING SYSTEMS

RELATED APPLICATIONS

This application claims priority to U.S. Provisional No. 60/914,618, filed Apr. 27, 2007, and is a continuation-in-part of U.S. Ser. No. 11/758,986, filed Jun. 6, 2007, which is a continuation of U.S. Ser. No. 11/220,016, filed Sep. 6, 2005, which claims priority to U.S. Provisional No. 60/607,327, filed Sep. 3, 2004. U.S. Ser. No. 11/758,986 is also a continuation-in-part of U.S. Ser. No. 11/437,085, filed May 19, 2006, which is a divisional of U.S. Ser. No. 10/325,129, filed Dec. 20, 2002 (now U.S. Pat. No. 7,049,597), which claims priority to U.S. Provisional No. 60/344,130, filed Dec. 21, 2001.

U.S. GOVERNMENT RIGHTS

The U.S. Government has certain rights in this invention as provided for by the terms of Contract #F19628-03-C-0079 awarded by the U.S. Air Force.

BACKGROUND

Hyperspectral imaging is a technique used for surveillance and reconnaissance in military, geophysical and marine science applications. Objects viewed by a hyperspectral imaging system are often observed in three-dimensions, x, y (spatial) and $\lambda$ (color wavelength). Spatial observations (x, y) allow a person to observe an image when high contrast is available. However, when an object is too far away to resolve, is camouflaged, or of unique chemical composition, spectral signatures help identify otherwise unobservable objects, for example to differentiate between friendly and enemy artillery.

Hyperspectral imaging typically employs a scanning slit spectrometer; although Fourier-transform imaging spectrometers (FTIS) and scanning filter (Fabry-Perot) imaging systems have also been used. These devices, however, record only two-dimensions of a three-dimensional data set at any one time. For example, the scanning slit spectrometer takes spectral information over a one-dimensional field of view (FOV) by imaging a scene onto a slit then collimating light from the slit through a dispersive element (prism) and re-imaging various wavelength images of the slit onto a detector array. In order to develop three-dimensional information, the slit is scanned over the entire scene producing different images that must be positionally matched in post-processing. The FTIS and Fabry-Perot techniques also scan: the former scans in phase space and the latter scans in frequency space.

Current scanning spectrometer designs have resulted in large, expensive and unwieldy devices that are unsuitable for hand-held or vehicle applications. While these spectrometers have been employed effectively in airborne and satellite applications, they have inherent design limitations. These limitations arise due to motion of the associated platform, motion or changes in the atmosphere, and/or motion of the objects in the image field that occur during scan sequences. Motion of the platform results in mismatched and misalignment, reducing the resolution and hence the effectiveness of the observations. At the same time, a moving object, such as a missile, may escape detection if the object is moving faster than the spectrometer scan rate.

SUMMARY

In one embodiment, a hyperspectral imaging system includes a focal plane array and a grating-free spectrometer that divides a field of view into multiple channels as bars and that reimages the bars as multiple spectral signatures onto the focal plane array.

In another embodiment, a hyperspectral imaging system includes imaging optics that form an image of an object, a focal plane array, a cylindrical lens array that forms multiple images of a pupil of the imaging optics, and a prism and grating coupled to the cylindrical lens array, to disperse the multiple images as multiple spectral signatures onto the focal plane array.

In another embodiment, a multiwavelength imager is provided. Imaging optics form an image of an object. At least one micromachined optical (MMO) element array is located at or near to an image plane of the imager, providing a spectral signature for use with a focal plane array.

In another embodiment, a hyperspectral imaging system includes imaging optics for forming an image of an object, a focal plane array for detecting spectral signatures, a slit array between the focal plane array and the imaging optic, the slit array imaging parts of the image into pupil images focused as bars, and a spectrometer for reimaging the bars as multiple spectral signatures onto the focal plane array. The imaging optics move to define which parts of the image are imaged into the pupil images.

In another embodiment, a method forms a dense hyperspectral data cube from a plurality of images. The plurality of images are sequentially captured over a period. Each of the plurality of images are sampled into multiple channels, each channel being focused into a bar. Each bar is dispersed to form a plurality of spectral signatures that are captured using a focal plane array. The captured spectral signatures are converted into a hyperspectral data cube.

BRIEF DESCRIPTION OF THE FIGURES

FIG. 9 illustrates exemplary MMO's of FIG. 8.

DETAILED DESCRIPTION

A hyperspectral imaging system is disclosed herein which may achieve high instrument resolution by recording three-dimensions, two spatial dimensions (x and y) and a spectral or color dimension ($\lambda$), simultaneously. Further, the hyperspectral imager may be handheld and operate to disperse and refocus an image without using moving parts. The imaging optics may for example image faster than at most f/5.

Figure 1:
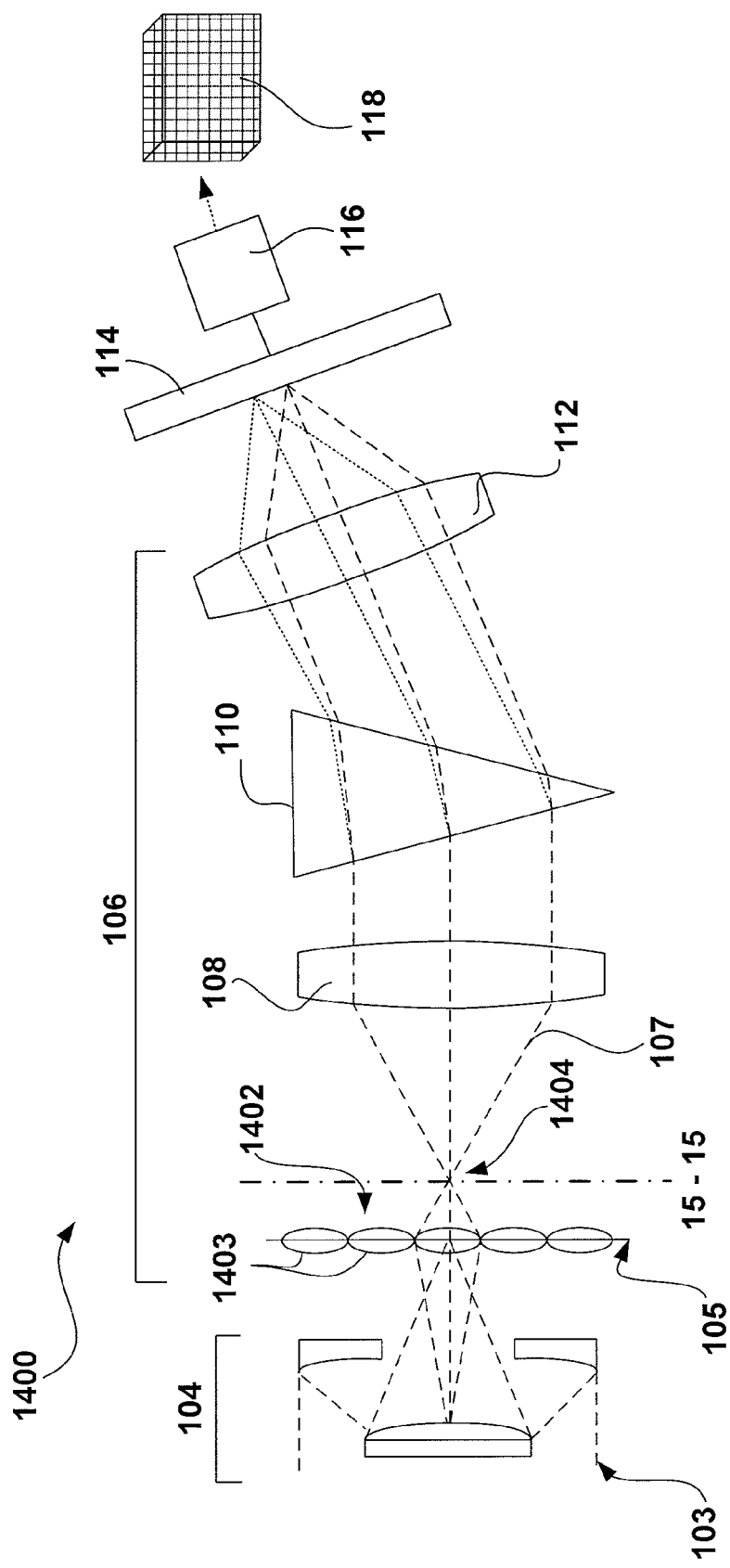
FIG. 1 illustrates a hyperspectral imaging system including a cylindrical lens array in accord with an embodiment.
Figure 2:
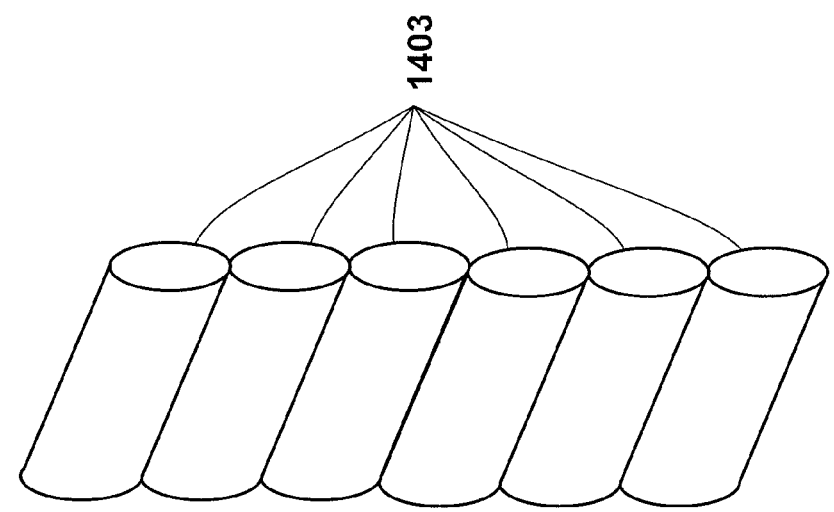
FIG. 2 illustrates a perspective view of the cylindrical lens array of FIG. 1.

FIG. 1 shows a hyperspectral imaging system 1400 including a cylindrical lens array 1402. FIG. 2 shows cylindrical lens array 1402 in perspective view. Cylindrical lens array 1402 is at or near to an image plane 105 of imaging optics 104, to resample an image formed by imaging optics 104; cylindrical lens array 1402 is part of a spectrometer 106, discussed in more detail below. Cylindrical lens array 1402 may have more or fewer lenses 1403 than shown without departing from the scope hereof.

Imaging optics 104 are illustratively shown as a Cassegrain telescope but may instead comprise optical elements (e.g., as in FIG. 6) including refractive optical elements. Accordingly, imaging optics 104 may be a camera lens or other optical system that customizes imaging specifications by modifying f-number, modifying magnification, providing cold shielding, and/or providing filtering. Imaging optics 104 are illustratively shown imaging incoming electromagnetic radiation 103 onto image plane 105.

Figure 4:
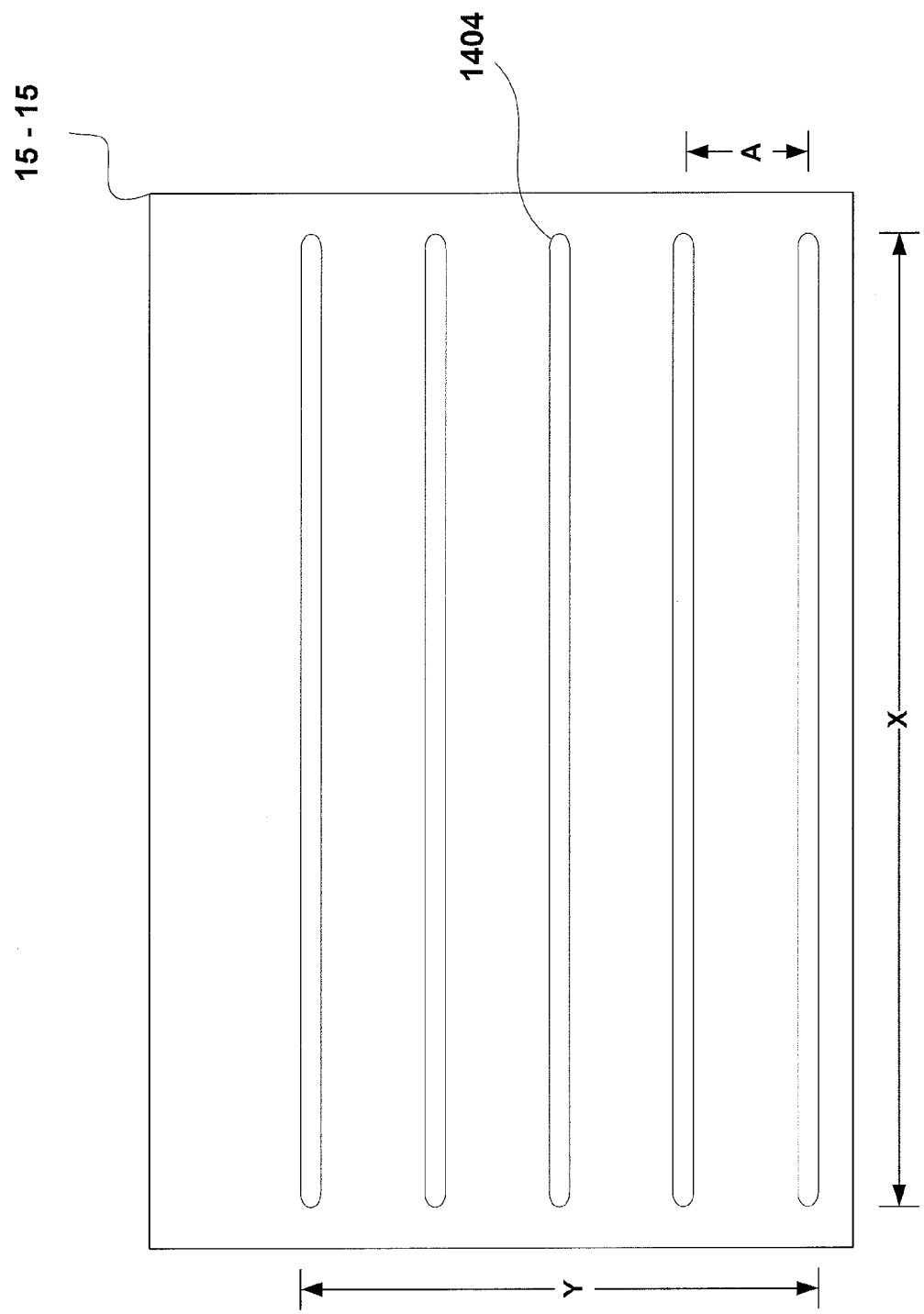
FIG. 4 illustrates an intensity pattern from a cylindrical lens array.

Spectrometer 106 divides the image from imaging optics 104 into multiple channels, where each channel forms a pupil image that is focused as a bar 1404 in an image plane 15-15 of cylindrical lens array 1402, as shown in FIG. 4. Collimating lens 108, dispersive element 110, and focusing lens 112 may be used in conjunction with cylindrical lens array 1402 to disperse and refocus multiple channels into multiple spectral signatures on focal plane array 114. In particular, FIG. 4 shows bars 1404 running continuously in the X direction and spaced a distance A in the Y direction. Spatial resolution is reduced in the Y direction by spacing A. Thus, in the Y direction, the image from imaging optics 104 is integrated and reduced in resolution. Sampling in the X direction is limited only by the resolution of focal plane array 114.

Figure 5:
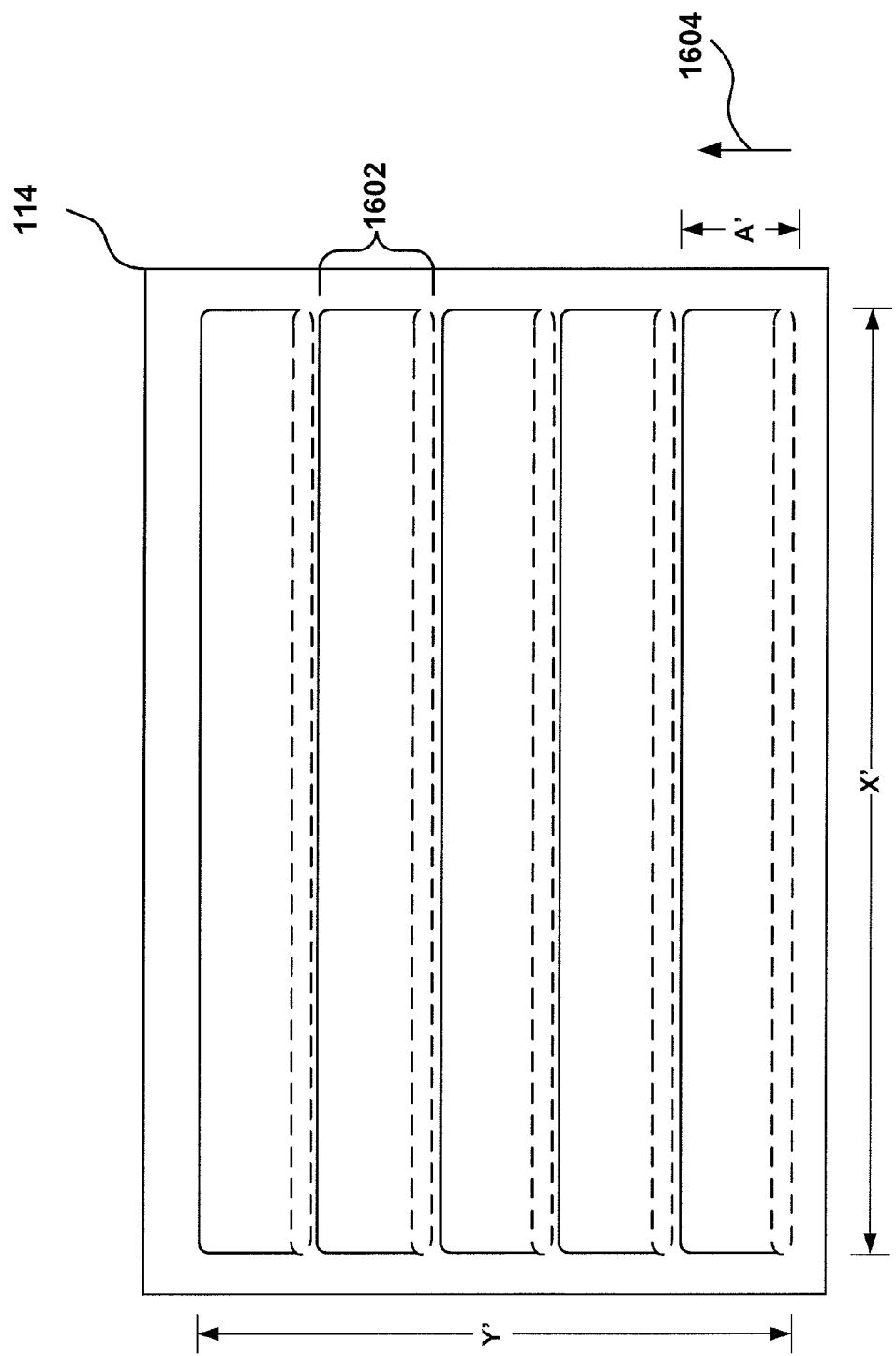
FIG. 5 illustrates an intensity pattern of spectra spread from individual channels.

FIG. 5 shows one exemplary view of a spectral image of dimensions X' and Y' formed at focal plane array 114. Dimension X' corresponds to, but is not necessarily equal to, dimension X of FIG. 4; dimension Y' corresponds to, but is not necessarily equal to, dimension Y of FIG. 4. In FIG. 5, each spectral signature 1602 is associated with a bar 1404 (each bar 1404 formed by a corresponding cylindrical lens of array 1402) such that all spectral images are recorded simultaneously on focal plane array 114. In particular, each bar 1404 is dispersed over a distance A' such that spectral signatures 1602 for adjacent bars 1404 do not overlap.

As illustrated in FIG. 5, a dispersion direction 1604 (i.e., angle of dispersive element 110 relative to focal plane 114) is perpendicular to the orientation of bars 1404 (and hence each cylindrical lens 1403 of cylindrical lens array 1402). The length A' of spectral signatures 1602 is determined by the dispersive power of dispersive element(s) 110. Accordingly, spectral resolution may be traded for spatial resolution in the Y dimension and vice versa. For a given detector size, the number of spectral bands may be doubled, for example, by increasing the dispersion of the prism and halving the number of cylindrical lenses in lens array 1402 and, hence, halving the number of spatial bar elements 1404 in the Y dimension (the X resolution is determined by the resolution of the detector and remains constant in this example). A zoom collimating or relay lens and/or a variable dispersion prism may also be used to variably adjust these spectral and spatial resolutions.

The images received by focal plane array 114 are captured by computer processor 116 and both the location of an image and the spectral information for that location are processed to form hyperspectral data cube 118. The data are collected in parallel and may be saved to memory and/or viewed in real time in any of the recorded wavebands. Data cubes 118 may be collected at the speed of the digital detector array, typically limited by its internal digital clock. Thus data cubes may be read, for example, at a rate between 1-1000 data cubes per second with a spectral resolution in a range of about 1-50 nm, for example.

In one example, focal plane array 114 is a CCD detector formed of 1024×1280 pixels; cylindrical lens array 1402 has 60 lenses, thereby producing 60 bars 1404; and dispersive elements 110 disperse bars 1404 into spectral signatures 1602 such that distance A' covers 20 pixels of focal plane array 114. The CCD detector thus simultaneously captures 20 spectral bins for each of 1024×60 spatial locations.

In one embodiment, hyperspectral imaging system 1400 may be mounted upon a movable platform that allows system 1400 to scan in the Y dimension, thereby allowing the system to build a dense data-cube by interlacing the captured spectral information over time to increase resolution in the Y dimension, described in further detail below. Alternatively, a scan mirror may be used with system 1400 to build a dense data-cube by interlacing the captured spectral information over time to increase resolution in the Y dimension.

Imaging optics 104 may be omitted from the hyperspectral imager of FIG. 1 in certain applications; in this embodiment, therefore, cylindrical lens array 1402 and a slit array serve to image the object as multiple channels through the spectrometer 106.

Figure 3:
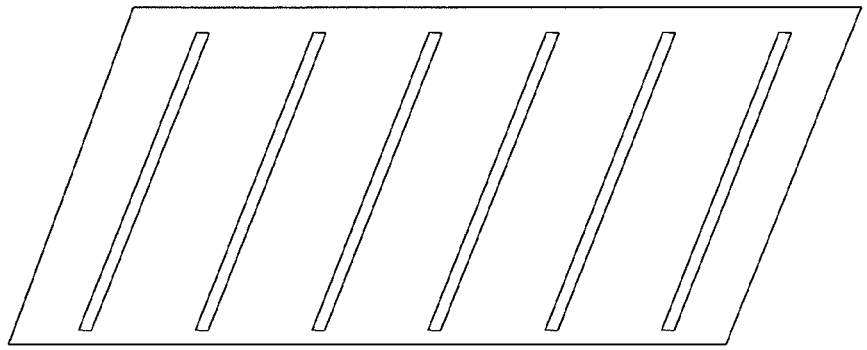
FIG. 3 illustrates a perspective view of the slit array of FIG. 6.
Figure 6:
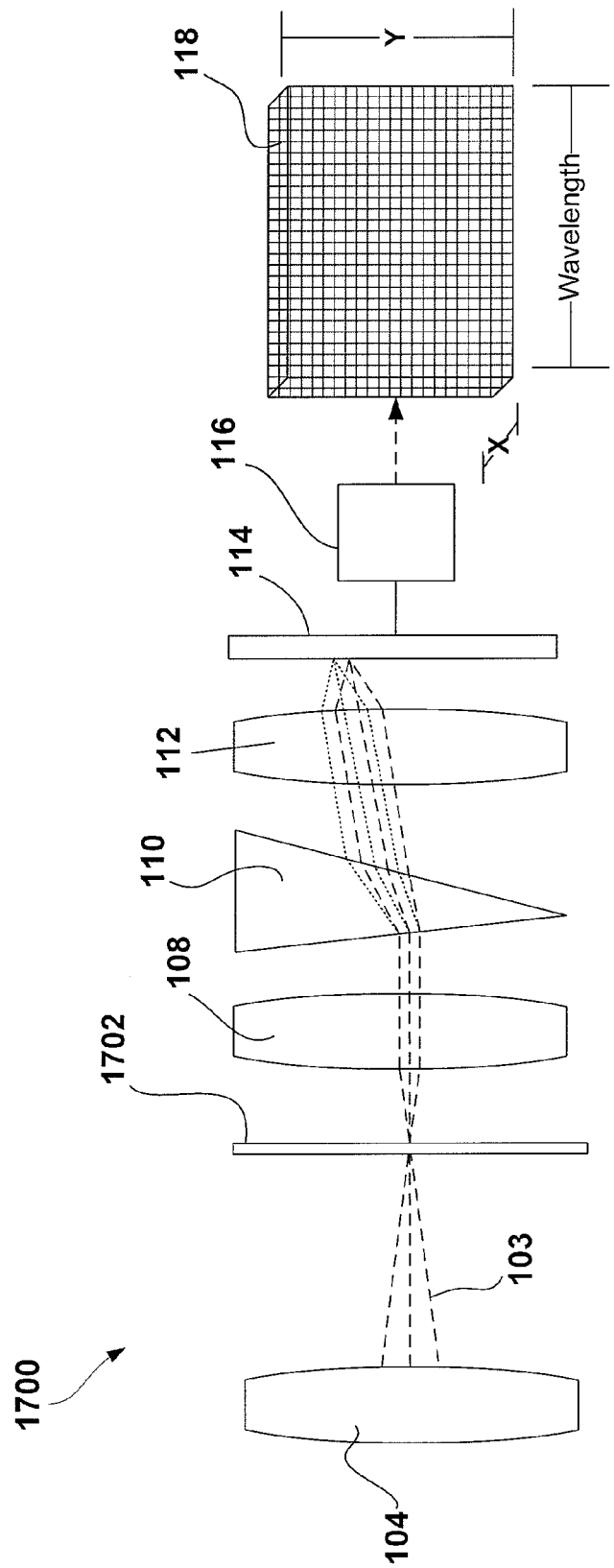
FIG. 6 illustrates a hyperspectral imaging system including a slit array in accord with an embodiment.

FIG. 6 illustrates a hyperspectral imaging system 1700 including a slit array 1702. FIG. 3 shows one exemplary perspective view of slit array 1702. Slit array 1702 may be used in place of, or in addition to, cylindrical lens array 1402, FIGS. 1 and 2, to divide the image into multiple channels. Slit array 1702 may be positioned at or near to the image plane of imaging optics 104. In one embodiment, slit array 1702 is moveable so that slit array 1702 is positioned to capture selective field positions of the object sampled by system 1700. If slit array 1702 is positioned near to, but not at the image plane, then defocus energy transmits through slits of array 1702 such that integration of field positions occurs through the several channels of system 1700. Slit array 1702 may be reflective to act as a narcissus mirror, to reduce background radiation in the case of infrared imaging. Similarly, slit array 1702 may be absorbing and cooled to reduce background radiation, which is particularly beneficial when the waveband sampled by the spectrometer is in the infrared. Collimating lens 108, dispersive element 110, and focusing lens 112 may be used in conjunction with slit array 1702 to disperse and refocus multiple channels into multiple spectral signatures on focal plane array 114.

If cylindrical lens array 1402 is used, the field integration may be accomplished with a circular aperture of the fore optic although a rectangular aperture of the fore optic is preferred. When slit array 1702 is used, a standard aperture is used. Further, when slit array 1702 is paired with cylindrical lens array 1402 stray light suppression may occur.

Figure 7:
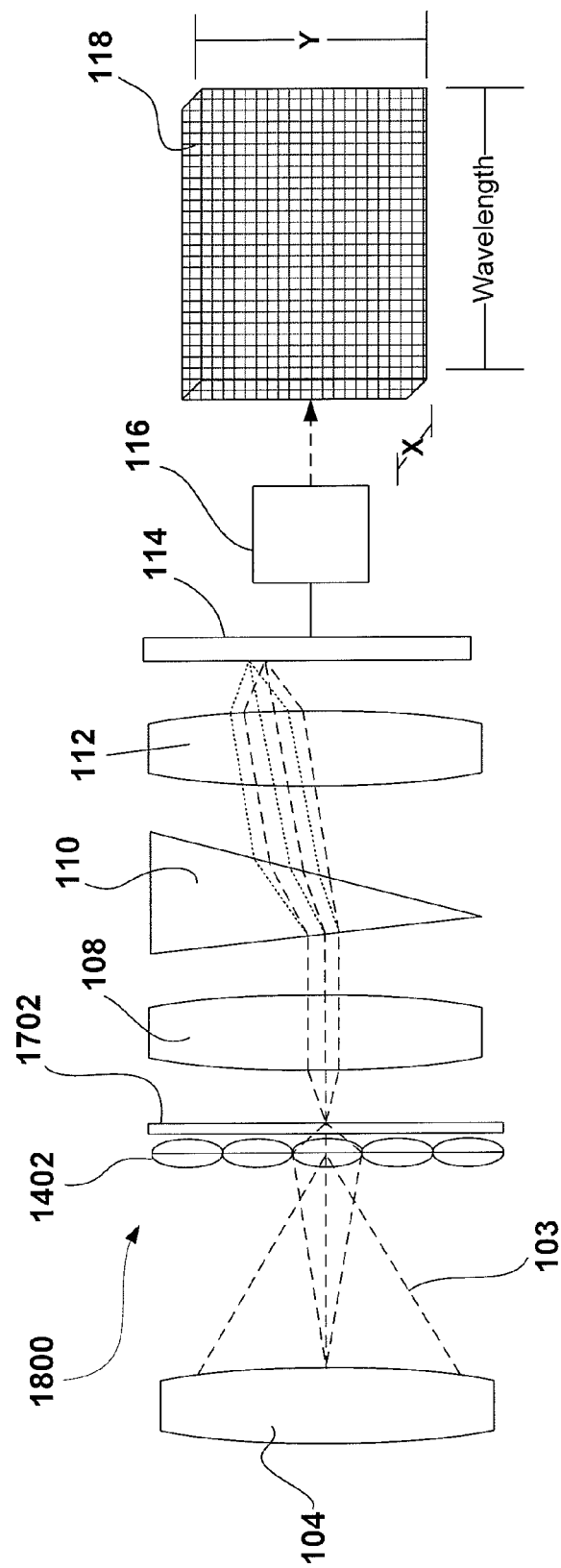
FIG. 7 illustrates a hyperspectral imaging system including a cylindrical lens array and a slit array in accord with an embodiment.

FIG. 7 illustrates a hyperspectral imaging system 1800 including cylindrical array 1402 and slit array 1702. Cylindrical lens array 1402 may be located between the object and slit array 1702 with each lens of cylindrical lens array 1402 aligned with a corresponding slit of slit array 1702. The pitch of cylindrical lens array 1402 and slit array 1702 are the same when imaging optics 104 are present, i.e., each slit is located at the optical axis of a lens. If imaging optics 104 are not present within system 1800, electromagnetic energy 103 may be directly sampled by cylindrical lens array 1402 and slit array 1702 by differing the pitch between cylindrical lens array 1402 and slit array 1702. The pitch between cylindrical lens array 1402 and slit array 1702 are made to differ by offsetting the optical axis of one array relative to the other.

Figure 8:
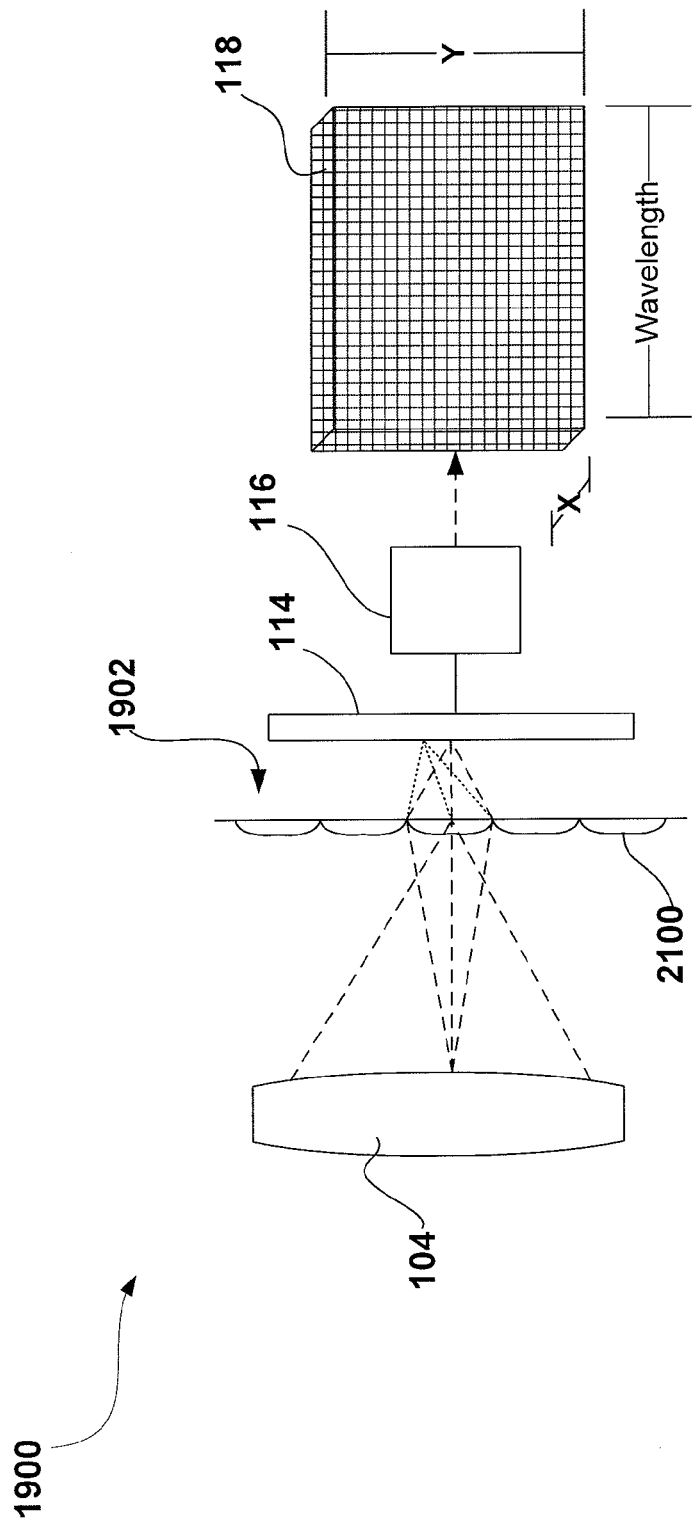
FIG. 8 illustrates a hyperspectral imaging system including a micromachined optical (MMO) assembly of cylindrical lenses in accord with an embodiment.

FIG. 8 shows a micro-machined optical ("MMO") element array 1902 formed of a plurality of MMO elements 2100 that both disperses and refocuses electromagnetic radiation within a hyperspectral imager 1900. Expanded cross-sectional views of several exemplary MMO elements 2100 are shown in FIG. 9. MMO element 2100 (1) is shown with a lens 2202 (a grating may be etched into the front or back of lens 2202). MMO 2100 (2) is shown with a lens 2202 coupled to a prism 2206. Prism 2206 may be configured to block a selected order by total internal reflection within the prism, but yet allow other spectral orders to be transmitted through lens 2202. See, e.g., FIG. 10A. In yet another example, a Fresnel lens 2208 forms a MMO 2100 (3).

Figure 10B:
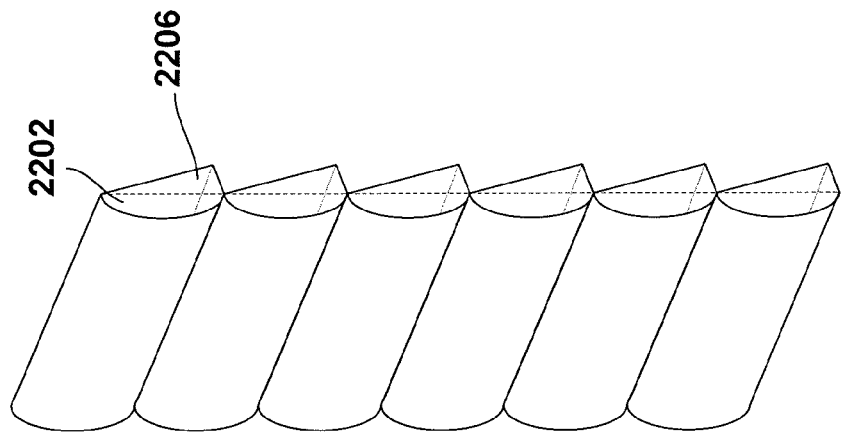
FIG. 10B illustrates a perspective view of one MMO assembly in accord with an embodiment.
Figure 10A:
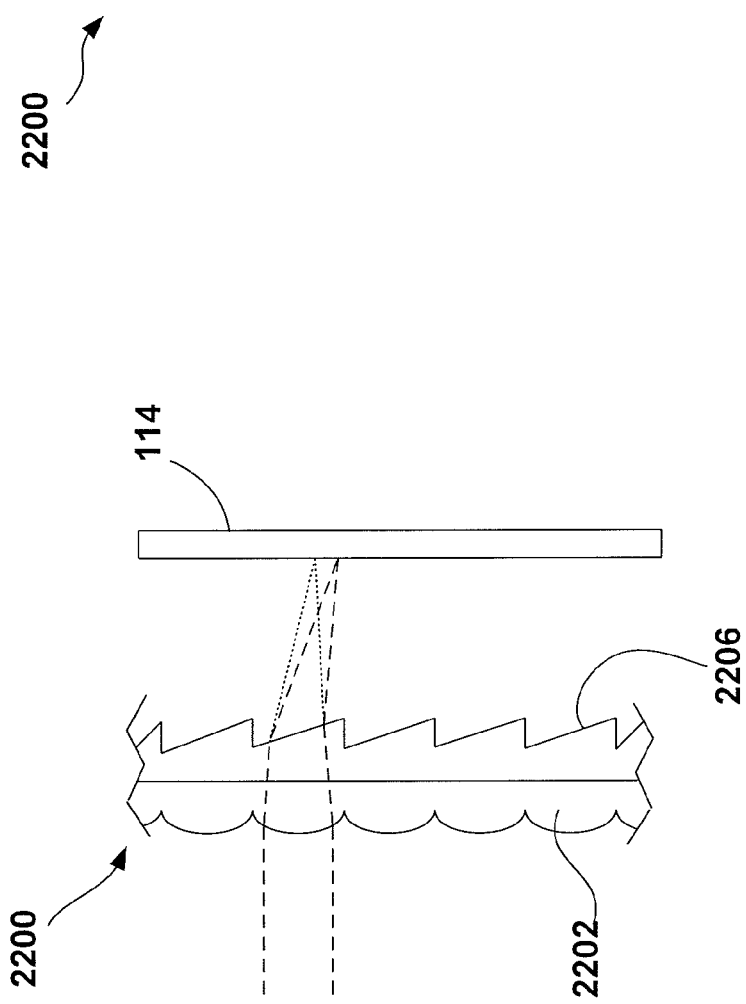
FIG. 10A illustrates a cross-section of one MMO assembly in accord with an embodiment.

The use of MMO's may reduce the overall size and complexity of the hyperspectral imaging system, as well as increase the durability of an instrument using the hyperspectral imaging system, because there are no moving parts. Since the MMO elements are micro-machined they are ideally suited for manufacturing in silicon for use in infrared imagers. Alternatively, using a low cost replicating technique, the MMO elements may be molded into epoxy on glass, for use in the visible waveband. FIG. 10A illustrates a cross-section of a MMO element array 2200 having lenses 2202, for receiving and refocusing radiation, each coupled with a prism 2206 (and/or alternatively, a grating instead) that disperses radiation into its constituent wavelengths (spectral signature) and onto focal plane array 114. FIG. 10B shows a perspective view of cylindrical lens array 2200 illustrating lenses 2202 and prisms 2206.

Figure 11:
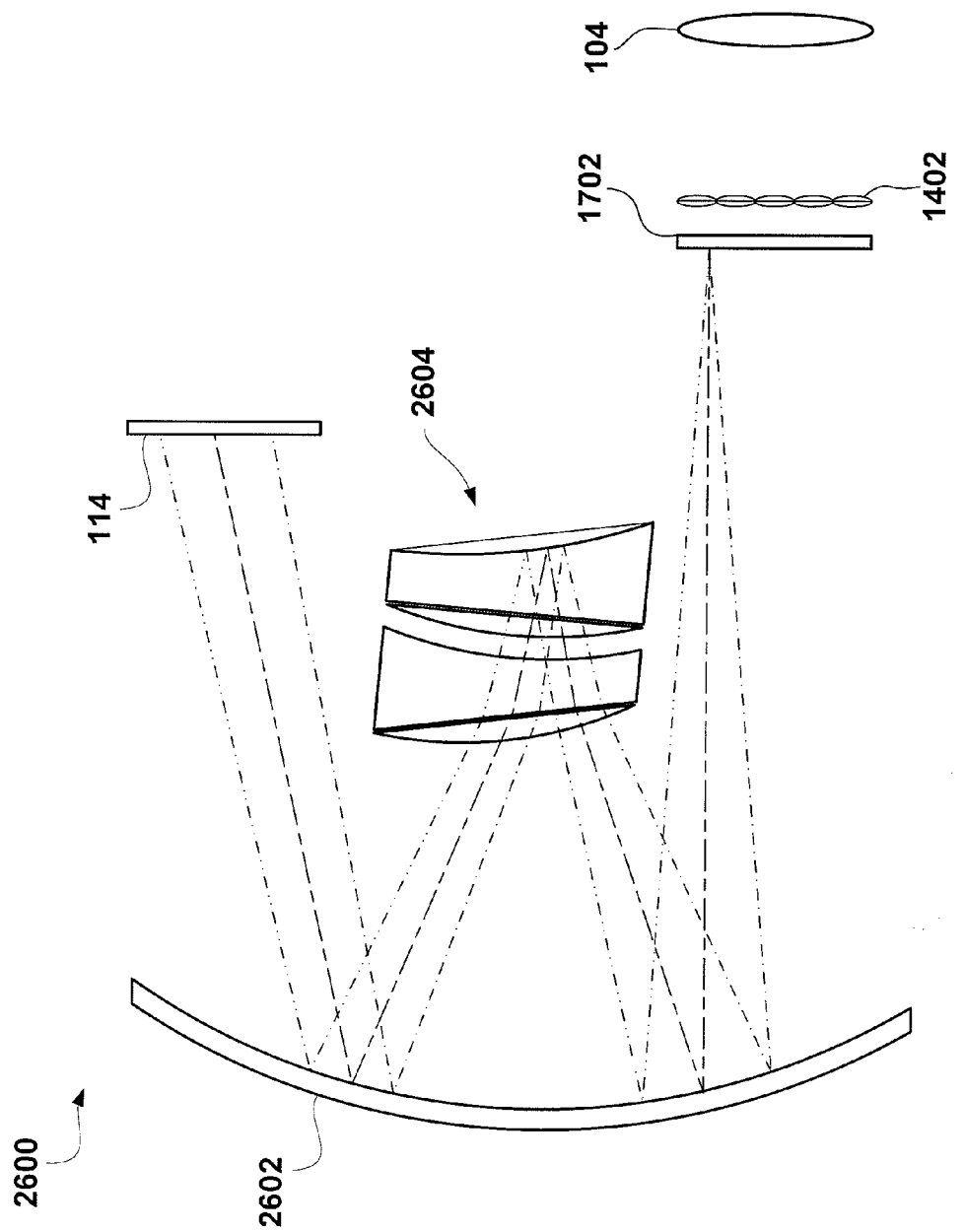
FIG. 11 illustrates a compact hyperspectral imaging system embodiment based upon an Offner based design and including a Mangin mirror/prism element.

FIG. 11 illustrates a hyperspectral imaging system 2600 including a spherical focusing mirror 2602, a focal plane array 114, a Mangin mirror/prism 2604, a cylindrical lens array 1402 and/or a slit array 1702. The compact Offner based folded-mirror design of hyperspectral imaging system 2600 allows the core optics (e.g., mirrors 2602, 2604, cylindrical lens array 1402 and/or a slit array 1702) to be contained within a three-inch cube, in one embodiment, so that it may be easily carried and used in mobile (and even hand-held) applications. Cylindrical lens array 1402 and slit array 1702 are shown as examples and may be replaced by one or more of a cylinder lenslet array, a pinhole array, a slit array, and a lenslet array, or combination thereof. That is, in one example of operation, an image is focused onto cylindrical lens array 1402 or slit array 1702, which divides the image into channels. The image of each channel is dispersed by Mangin mirror/prism 2604 to form a spectral signature that is focused, by mirror 2602, onto focal plane array 114. The data from focal plane array 114 may then be collected into a data cube (e.g., data cube 118) for further analysis. Hyperspectral imaging system 2600 may include imaging optics 104 and other optical elements without departing from the scope hereof.

Figure 12:
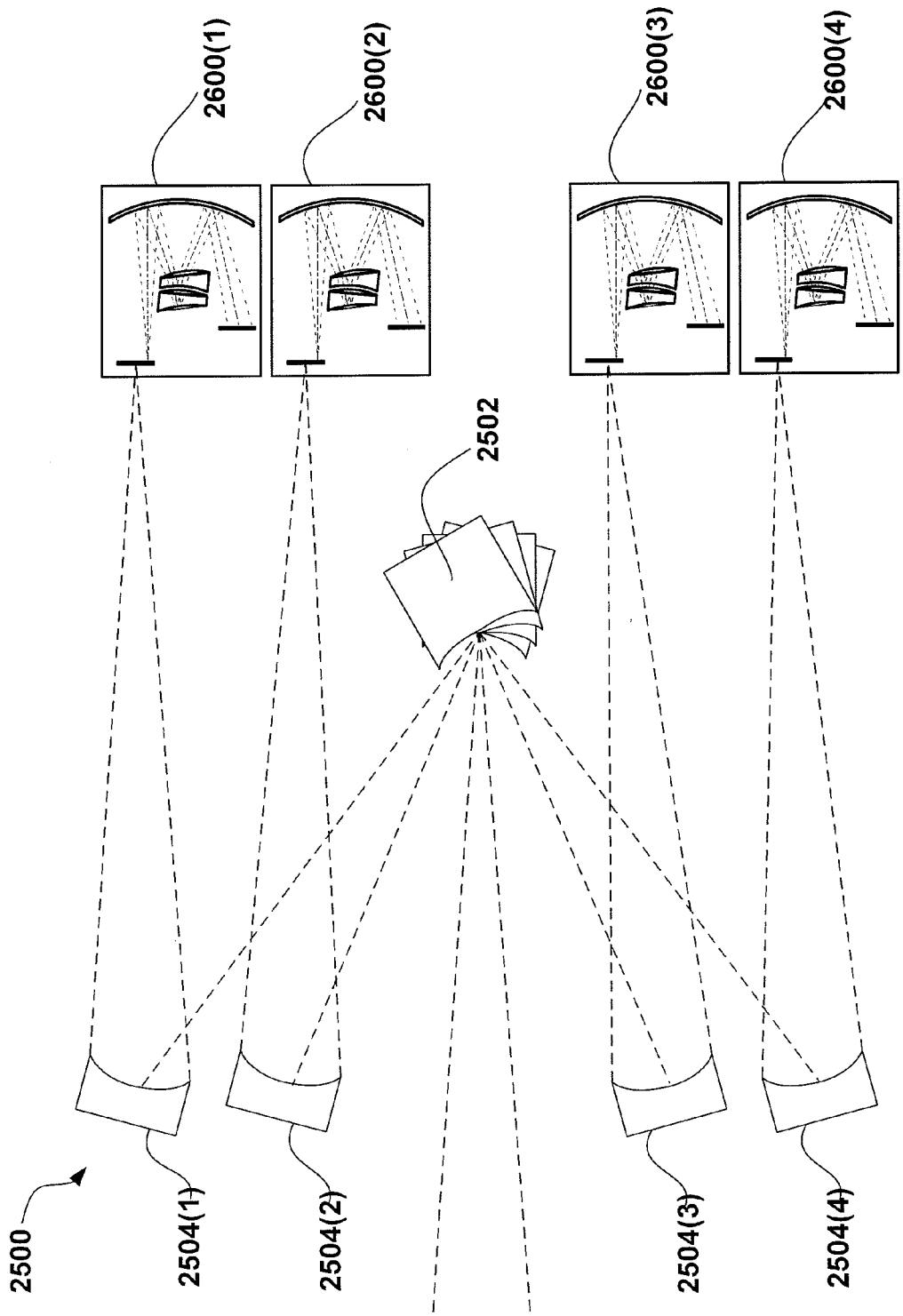
FIG. 12 illustrates a hyperspectral imaging system including an image slicer and a plurality of hyperspectral imaging systems of FIG. 11 in accord with an embodiment.

FIG. 12 illustrates a hyperspectral imaging system 2500 including an image slicer 2502. Image slicer 2502 divides an image received from the imaging optics (e.g., imaging optics 104, not shown). In the embodiment of FIG. 12, each slice of electromagnetic energy intersects a reflective element 2504 that transmits its associated energy to a designated spectrometer and detector combination 2600. For example, the spectrometer/detector combination may be that of hyperspectral imaging system 2600, although other hyperspectral imaging systems may be employed. Use of cylindrical lens array 1402 in combination with image slicer 2502 produces a two-dimensional field of view divided into multiple channels (these can be dispersed by a grating without order overlap, so long as there is small dispersion). The slicer divides the image into slices, each of which is dispersed into channels having a spectral signature.

Multiple hyperspectral imagers may be used to cover a large field of view. For example, the exterior of a surveillance plane may be covered with multiple hyperspectral imagers. Data from the multiple imagers may be compiled into one comprehensive data set for viewing and analysis.

Alternatively, a large-scale hyperspectral imager may be fabricated according to the present instrumentalities. For example, a large-scale imager may be used in aerial or satellite applications. The costs of fabricating and transporting an imager as herein disclosed may be less than similar costs associated with a traditional hyperspectral imaging system due to the decreased number of optical components and weight thereof.

Figure 13:
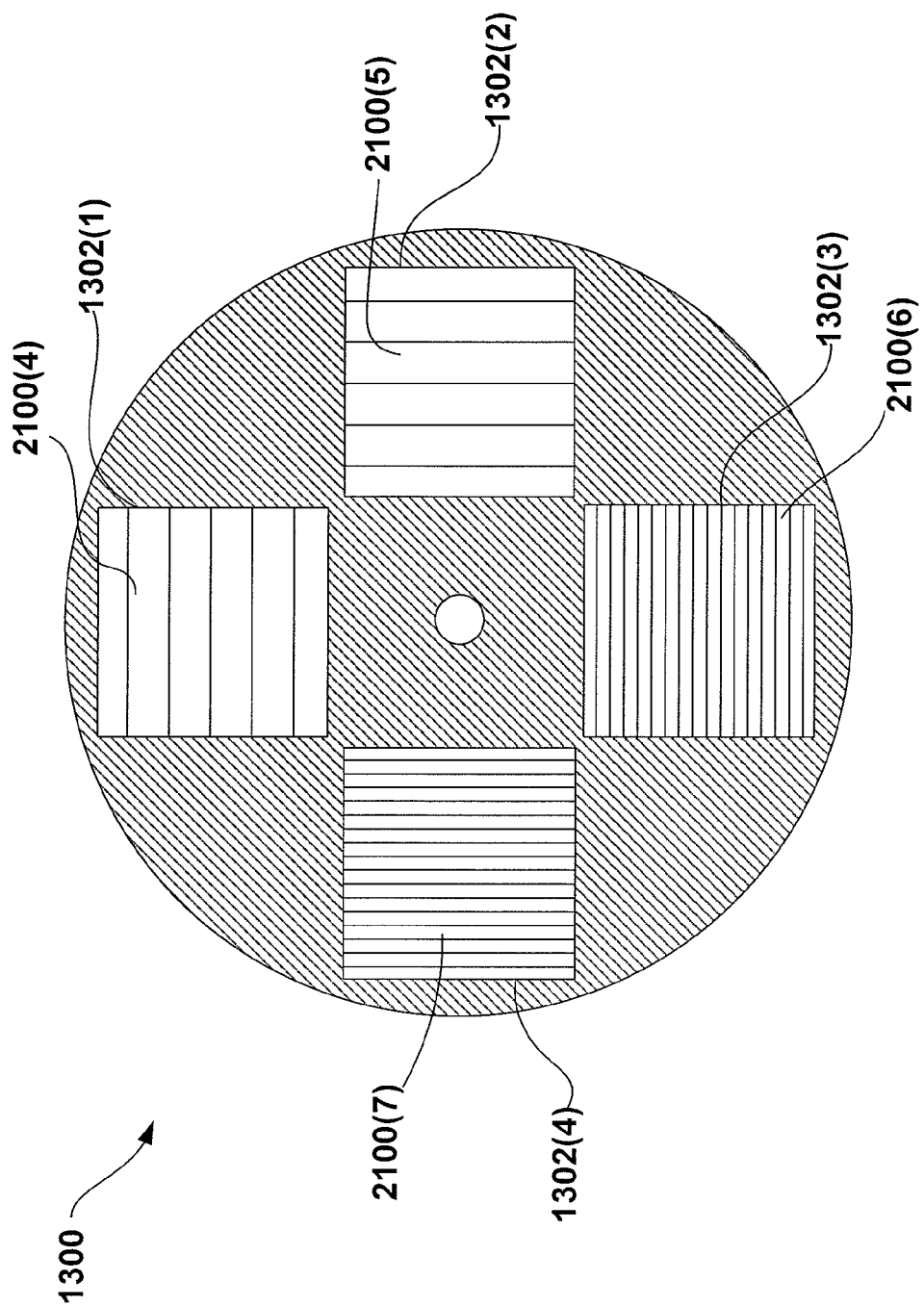
FIG. 13 illustrates an assembly wheel incorporating various MMOs in accord with an embodiment.

In one embodiment, illustrated in FIG. 13, an assembly wheel 1300 includes multiple MMO element arrays 1302 for use within hyperspectral imaging system 1900 of FIG. 8 in place of MMO element array 1902. That is, MMO element arrays 1302 may represent one or more of MMO element array 1902 and MMO element array 2200 of FIGS. 10A and 10B. Selection of any one MMO element array 1302 provides differing spectral signatures from any other MMO element array of assembly wheel 1300. For example, MMO element arrays 1302(1) and 1302(2) provide MMO elements 2100(4) and 2100(5), respectively. However, MMO elements 2100(5) may include different optical components, i.e., filters and/or prisms, than MMO elements 2100(4). MMO element arrays 1302(3) and 1302(4) provide close packed MMO elements 2100(6) and 2100(7), respectively, and the optical components of MMO elements 2100(6) and 2100(7) may differ. MMO elements 2100(4) and 2100(5) are larger than MMO elements 2100(6) and 2100(7). Large MMO elements may provide for decreased spatial resolution, but increased spectral resolution.

Figure 13A:
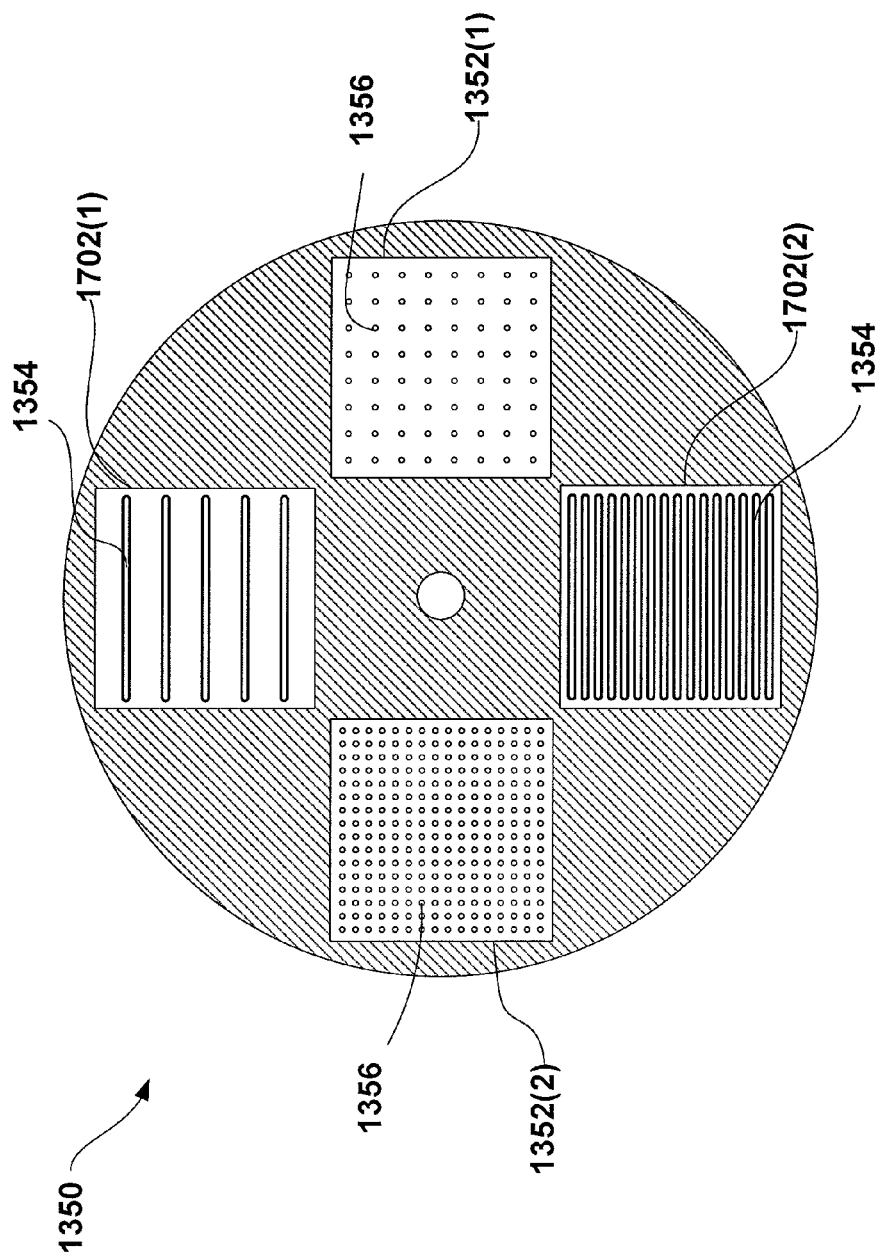
FIG. 13A illustrates an assembly wheel incorporating various pinhole arrays and slit arrays in accord with an embodiment.

FIG. 13A shows an assembly wheel 1350 with two pinhole arrays 1352(1), 1352(2) and two slit arrays 1702(1), 1702(2), in an alternate embodiment. Assembly wheel 1350 may be used in place of cylindrical lens array 1402 of hyperspectral imaging system 1400, FIG. 1, in place of slit array 1702 of hyperspectral imaging system 1700, FIG. 6, and cylindrical lens array 1402 and/or slit array 1702, of hyperspectral imaging system 1800, FIG. 7. That is, slit arrays 1702 may represent slit array 1702 of FIG. 3 and FIG. 6. Pinhole array 1352(1) is shown with fewer pinholes 1356 than pinhole array 1352(2). Slit array 1702(1) is shown with fewer slits 1354 than slit array 1702(2). MMO element arrays (e.g., MMO element arrays 1302), pinhole arrays 1352 and slit arrays 1702 may be combined in any number and order within an assembly wheel (e.g., wheel 1350) to provide desired functionality within a hyperspectral imaging system.

Where an assembly wheel (e.g., assembly wheel 1300, 1350) does not include prisms (e.g., prism 2206) or other dispersion components, it may then be desirable to vary the amount of dispersion to accommodate various lens sizes and aperture (e.g., pinhole, slit) spacing. For example, dispersive element(s) 110 of systems 1400, 1700 and 1800 may be rotated to increase dispersion when large lenses or large aperture spacing is used and to decrease dispersion when small lenses or small aperture spacing is used, to sample an image. Zoom lenses may also be used beneficially with an assembly wheel having differing lens sizes and aperture spacing within the hyperspectral imaging system.

Figure 14:
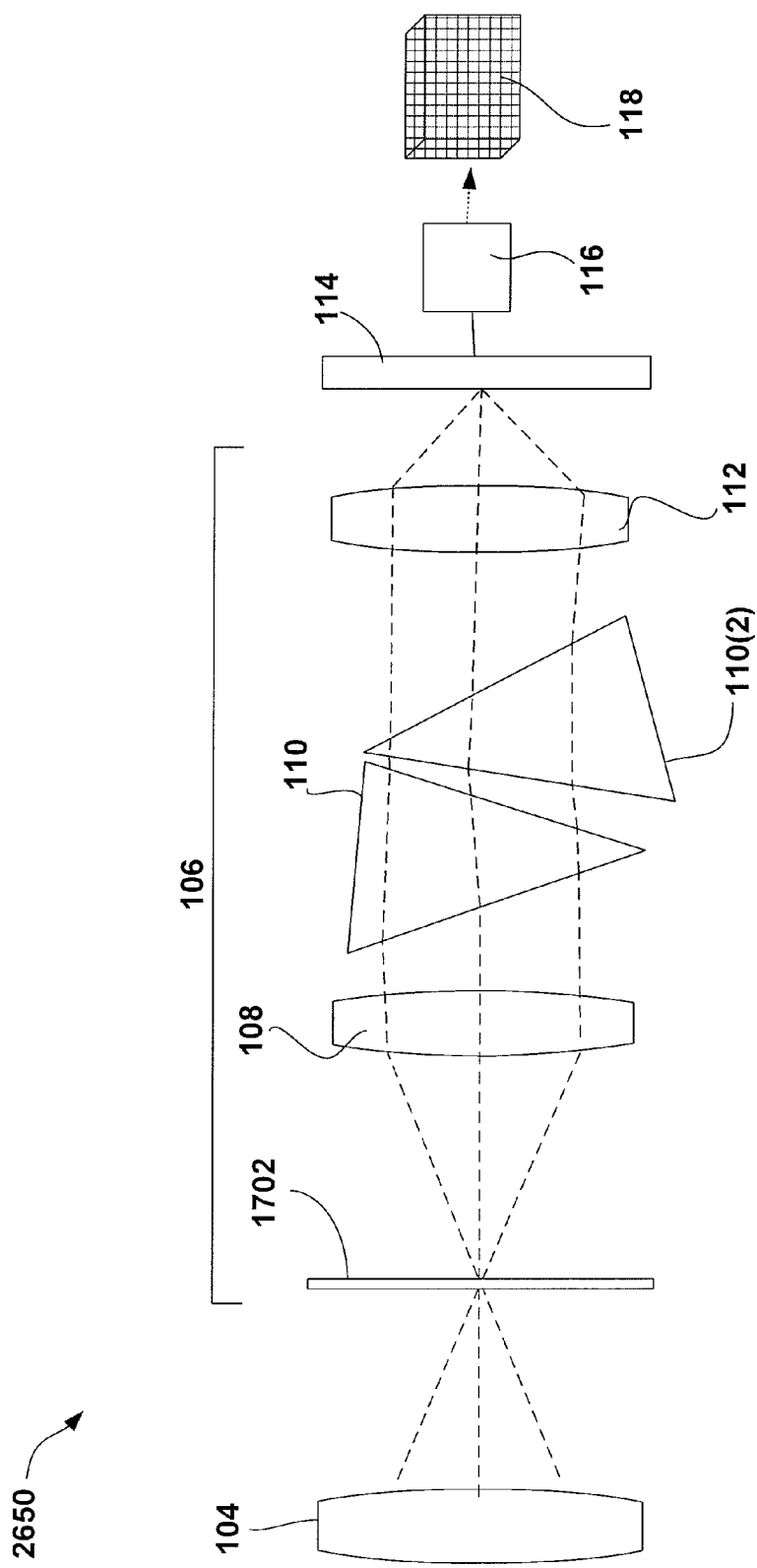
FIG. 14 illustrates a hyperspectral imaging system including a slit array and crossed prisms that have varying dispersions and produce zero deviation of electromagnetic energy in accord with an embodiment.
Figure 15:
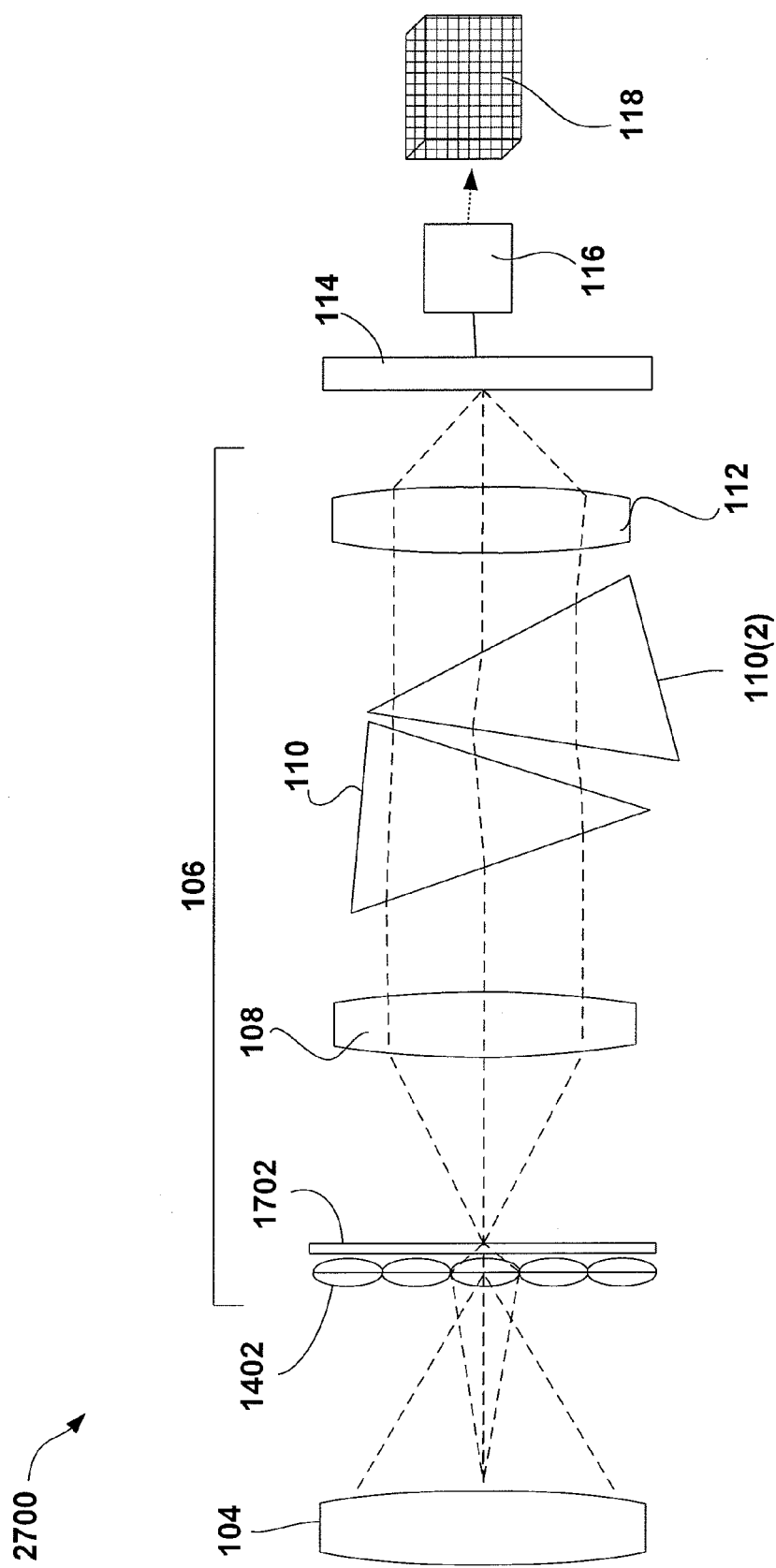
FIG. 15 illustrates a hyperspectral imaging system including a cylindrical lens array, a slit array and crossed prisms that have varying dispersions and produce zero deviation of electromagnetic energy in accord with an embodiment.

FIG. 14 illustrates a hyperspectral imaging system 2650 including a slit array 1702 and crossed prisms 110, 110(2) that, depending on orientation, produce varying dispersion and deviation. Likewise, FIG. 15 illustrates a hyperspectral imaging system 2700 including a cylindrical lens array 1402, a slit array 1702 and crossed prisms 110, 110(2) that, depending on orientation, produce varying dispersion. Prisms 110 and 110(2) may counter rotate to provide variable dispersion without beam displacement.

Figure 16:
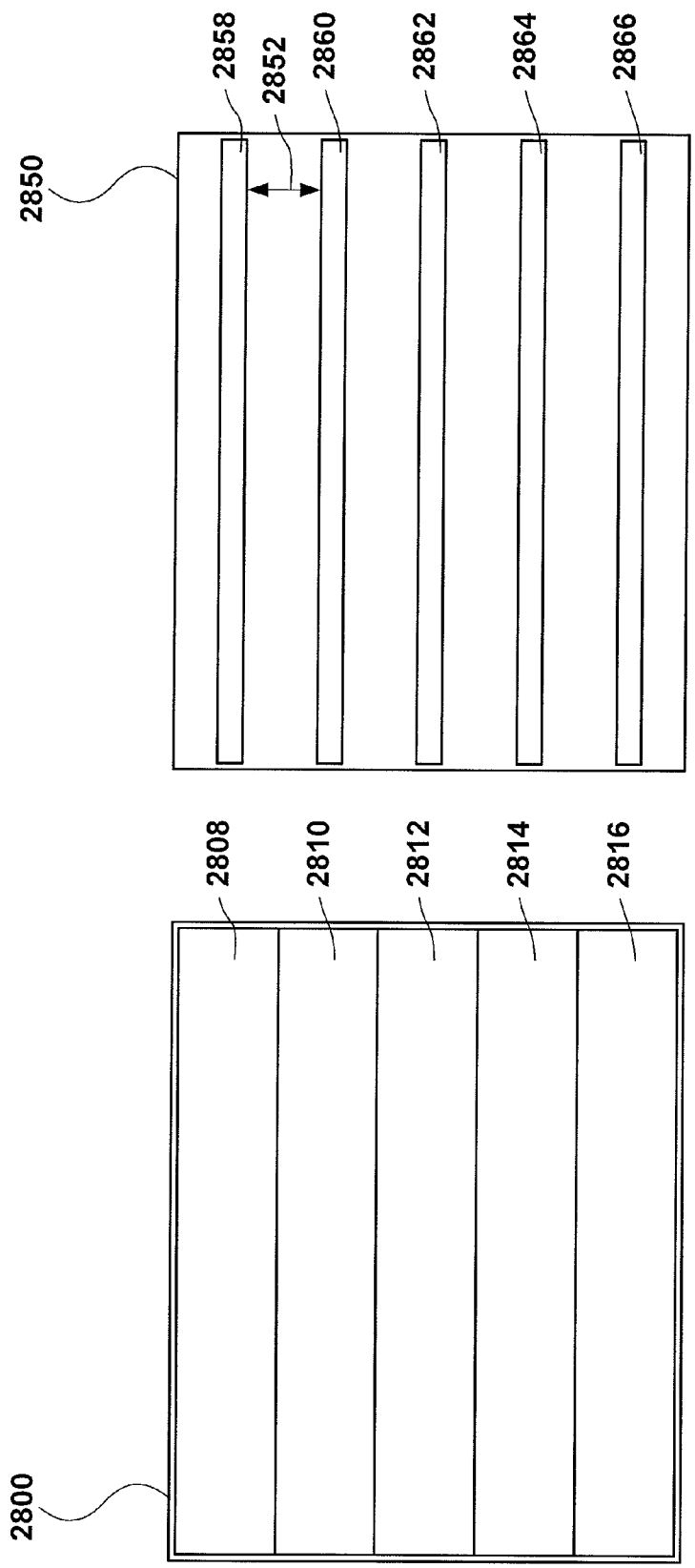
FIG. 16A illustrates an object with five adjoining imaged areas.
FIG. 16B illustrates an object with five non-adjoining imaged areas.

FIG. 16A shows an object 2800 divided into five areas 2808, 2810, 2812, 2814 and 2816, as imaged by a hyperspectral imager (e.g., hyperspectral imager 2700). In the example of FIG. 16A, imaging optics 104, cylindrical lens array 1402 and slit array 1702 of imager 2700 are configured to sample object 2800 with five adjoining areas 2808, 2810, 2812, 2814 and 2816, where each area is spectrally processed by one of the cylindrical lens of cylindrical lens array 1402 and/or one slit of slit array 1702. That is, the field of view of imaging optics 104, and sampling by cylindrical lens array 1402 and slit array 1702, substantially provide complete cover of object 2800. In an example shown in FIG. 16B, imaging optics 104, cylindrical lens array 1402 and slit array 1702 of imager 2700 are configured to process an object 2850 with five non-adjoining imaged areas 2808, 2810, 2812, 2814 and 2816 that are spaced by distance 2852. That is, object 2850 is sparsely sampled by imager 2700. The sparse sampling may be filled in by defocusing the primary lens. Of note, imaging optics, cylindrical lens arrays and slit arrays of each of imagers 1400, 1700, 1800, 1900, 2600, 2650 and 2700 may be configured to capture adjoining object areas (i.e., all of an object) or non-adjoining areas (i.e., part of an object).

Figure 17:
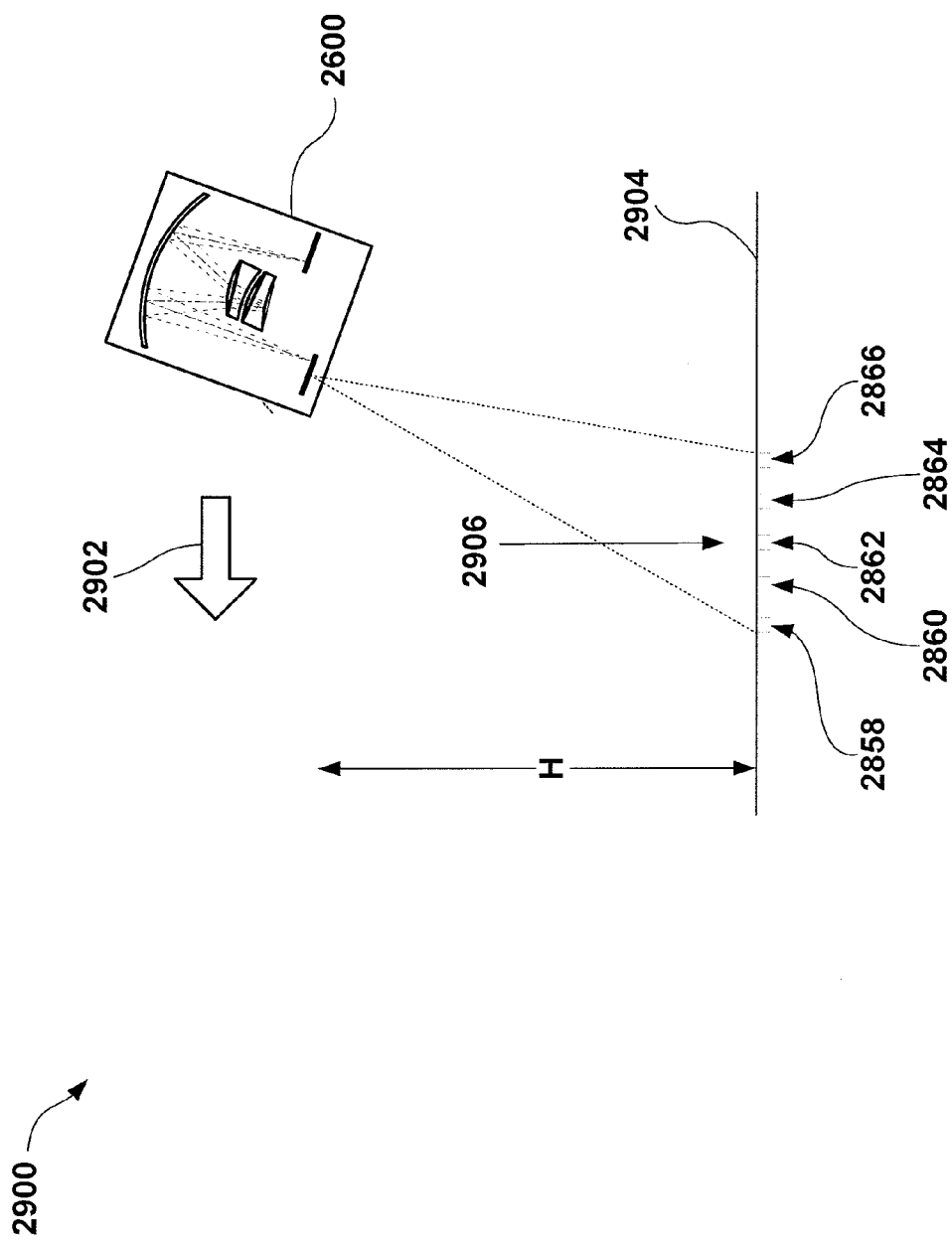
FIG. 17 illustrates a moving hyperspectral imager that forms a composite image cube from sequential images of an object.

FIG. 17 illustrates hyperspectral imager 2600 of FIG. 11 traveling with a velocity indicated by arrow 2902 over an object 2904 (e.g., the ground) to be imaged. For example, imager 2600 may be mounted on or in a vehicle, such as an aircraft, to image objects on the ground. Given the velocity 2902 and height (H) of imager 2600 above object 2904, a frame rate may be determined such that sequential images areas may be combined to form a dense image. Imager 2600 is shown simultaneously capturing images of areas 2858, 2860, 2862, 2864 and 2866. As imager 2600 moves, sequent images combine to form a higher resolution image of object 2904. In an alternate embodiment, a scan mirror may be used to scan the field of view of hyperspectral imager 2600.

Figure 18:
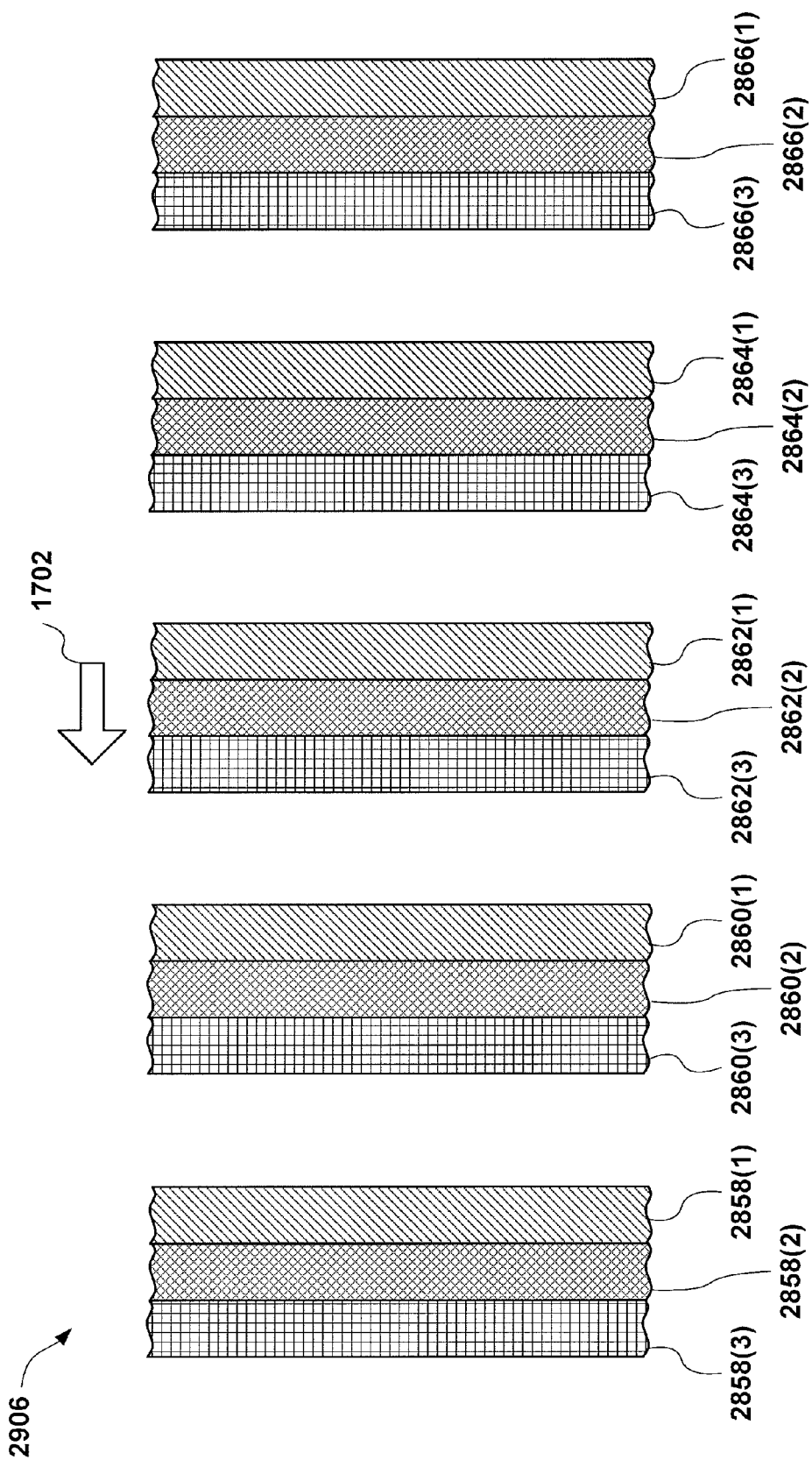
FIG. 18 illustrates interleaving of sample areas of sequential images as the hyperspectral imager of FIG. 17 travels at a constant velocity.

FIG. 18 illustrates the interleaved sample areas 2858, 2860, 2862, 2864 and 2866 of sequential images of area 2906 of FIG. 17. By determining the image rate based upon velocity 2902 and height H, imager 2600 may capture adjoining images (e.g., image areas 2858(1), 2858(2) and 2858(3); image areas 2860(1), 2860(2) and 2860(3); image areas 2862 (1), 2862(2) and 2862(3); image areas 2864(1), 2864(2) and 2864(3); and image areas 2866(1), 2866(2) and 2866(3)) of object 2904 such that, over time, a complete image of object 2904 is captured.

Figure 19:
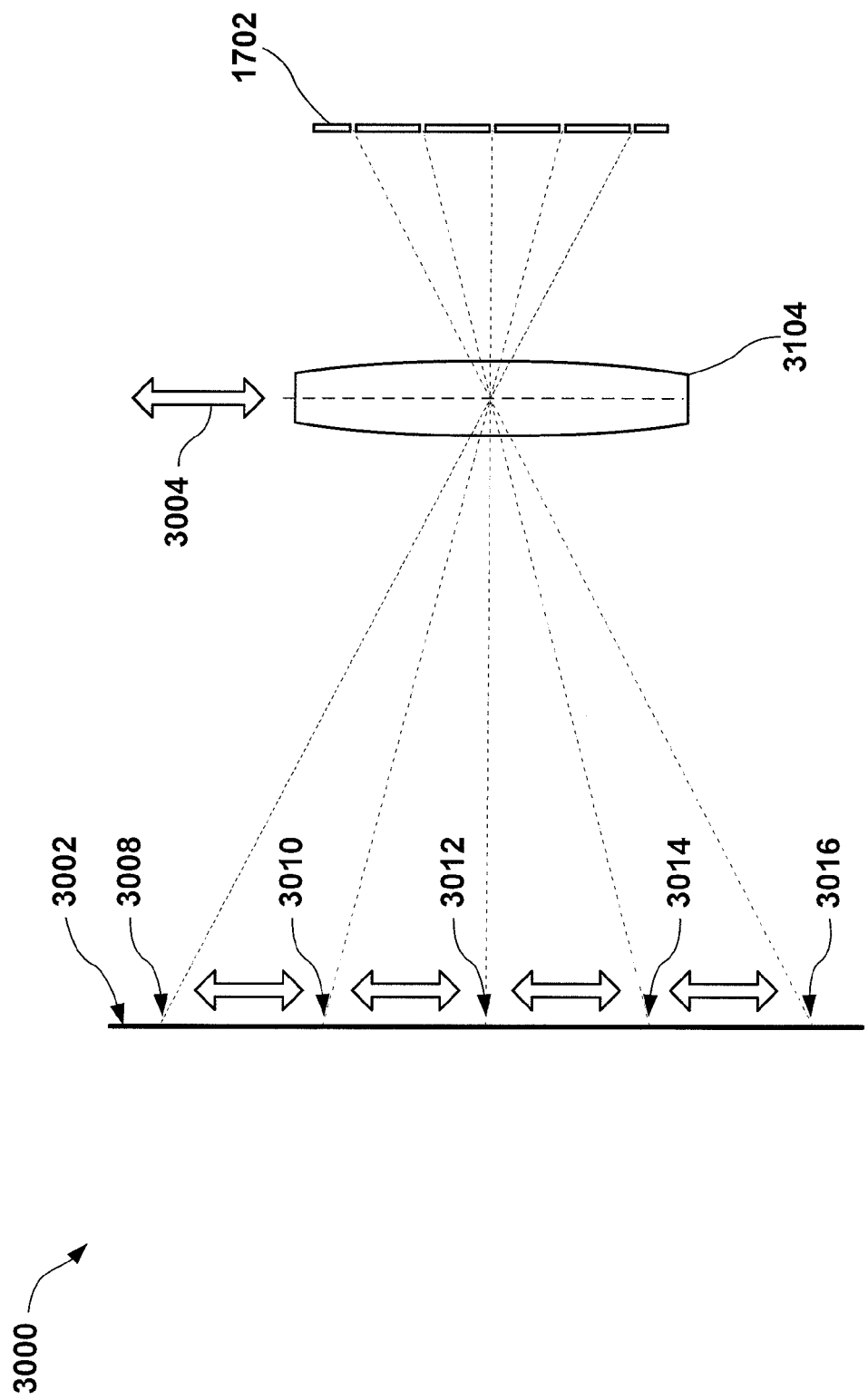
FIG. 19 shows part of one exemplary embodiment of a hyperspectral imaging system with an objective lens that moves laterally with respect to the plane of a cylindrical leans array and a slit array, to construct a complete image of an object over time.

FIG. 19 shows part of one exemplary embodiment of a hyperspectral imaging system (e.g., any of imaging systems 1400, 1700, 1800, 1900, 2600, 2650 and 2700) with an objective lens 3104 that moves laterally as indicated by arrow 3004, with respect to the plane of slit array 1702, to construct a complete image of an object 3002 over time. As shown, five non-adjoining areas 3008, 3010, 3012, 3014 and 3016 of object 3002 are simultaneously imaged by objective lens 3104, cylindrical lens array 1402 and slit array 1702. As objective lens 3104 moves relative to cylindrical lens array 1402 and slit array 1702, the areas of object 3002 that are imaged also move. Thus, by moving objective lens 3104 relative to slit array 1702 and capturing sequential images over time, a complete image of object 3002 may be constructed. Thus, if the hyperspectral imager (e.g., imager 2600, FIG. 11) that includes a movable objective lens 3104 is mounted on a non-movable platform, an object (e.g., object 3002) may be 'scanned' to capture multiple images that form a high density image cube of the object. In an alternative embodiment, a scan mirror may be included to scan the field of view without moving objective lens 3104. This can also be accomplished by using a scanning mirror between the lens and object to scan the field of view (not shown)

Object identification, which is more than mere recognition, may be performed by software to distinguish objects with specific spatial, spectral and temporal signatures. For example, materials from which objects in the image are made may be spectrally distinguished, e.g., in the visible range, paint on an enemy tank may be distinguished from paint on a friendly tank, while in the infrared region, a water treatment plant may be distinguished from a chemical weapons factory. The software may be trained to color code or otherwise highlight elements of the image with particular spatial and/or spectral and/or temporal signatures.

Multiple hyperspectral imagers may be used to cover a large field of view. For example, the exterior of a surveillance plane may be covered with multiple hyperspectral imagers. Data from the multiple imagers may be compiled into one comprehensive data set for viewing and analysis.

The above disclosure thus describes hyperspectral imaging systems primarily with the use of prisms for dispersion, because diffraction gratings operate over one order (and then overlap). Since the hyperspectral imaging system overlaps in space, it cannot utilize another order in the same place unless the spectral band is narrow. As in FIGS. 14, 15, multiple dispersing prisms may also be used: one prism for high dispersion and the second a correcting prism that has much lower dispersion (because of different material).

With regard to MMO elements, various combinations of optical elements may achieve similar results, as shown in the above figures. For example, one MMO element pairs a cylindrical lens array with Fresnel prisms. But, through an array of slits, light energy is also dispersed so that each slit is spread over, e.g., twenty pixels. Thus, the MMO elements may also operate this way since each may include a micromachined array of cylinders operate like the slit array. A similar result is achieved with a slit array and Fresnel prisms (a Fresnel lens with each slit), or with a Fresnel prism array (a slit array is not needed here as each prism is, in effect, its own slit).

A large-scale hyperspectral imager may be fabricated according to the present instrumentalities. For example, a large-scale imager may be used in aerial or satellite applications. The costs of fabricating and transporting an imager as herein disclosed may be less than similar costs associated with a traditional hyperspectral imaging system due to the decreased number of optical components and weight thereof.

Certain changes may be made in the systems and methods described herein without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. A hyperspectral imaging system, comprising:
   a focal plane array;
   a grating-free spectrometer for dividing a field of view into multiple channels as bars and for reimaging the multiple channels as multiple spectral signatures onto the focal plane array, the grating-free spectrometer having:
      first optics for collimating electromagnetic energy of an object along an optical axis;
      a first prism for dispersing the electromagnetic energy;
      a second prism for redirecting the spectra of the first prism along the optical axis; and
      second optics for focusing electromagnetic energy along the optical axis from the second prism and onto the focal plane array, and
   a processor connected with the focal plane array for forming a hyperspectral data cube from the multiple spectral signatures,
   wherein objects may be identified from the hyperspectral data cube.

2. The system of claim 1, further comprising imaging optics for forming an image of the object within the field of view and onto the grating-free spectrometer.

3. The system of claim 2, wherein the grating-free spectrometer further comprises an array of slits dividing the field of view of the imaging optics to form the multiple channels, the slits being positioned adjacent to an image formed by the imaging optics.

4. The system of claim 2, wherein the grating-free spectrometer further comprises one or both of a cylindrical lens array and an array of slits to sample the image.

5. The system of claim 2, wherein the grating-free spectrometer further comprises an array of slits dividing the field of view of the imaging optics to form the multiple channels.

6. The system of claim 5, the slits formed by a narcissus mirror with an array of apertures, to reduce background radiation onto the focal plane array.

7. The system of claim 5, the slits formed by an optically absorbing material with an array of apertures, the absorbing material being cooled to reduce background radiation onto the focal plane array.

8. The system of claim 1, the grating-free spectrometer further comprising: (a) a cylindrical lens array, to form the multiple channels; and (b) optics, to collimate electromagnetic energy of the multiple channels from the cylindrical lens array; wherein the first prism disperses the electromagnetic energy of the multiple channels into multiple spectral signatures.

9. The system of claim 8, wherein the grating-free spectrometer further comprises an array of slits dividing the field of view of the imaging optics to form the multiple channels.

10. The system of claim 9, the slits formed by a narcissus mirror with an array of apertures, to reduce background radiation onto the focal plane array.

11. The system of claim 9, the slits formed by an optically absorbing material with an array of apertures, the absorbing material being cooled to reduce background radiation onto the focal plane array.

12. The system of claim 1, further comprising an assembly wheel for positioning one of a pinhole array, an array of slits and a cylindrical lens array within the imager wherein selection of any one of the pinhole array, the array of slits and the cylindrical lens array provides differing spectral signatures from any other array of the assembly wheel.

13. A multiwavelength imager, comprising:
   imaging optics for forming an image of an object;
   a focal plane array;
   at least one micromachined optical (MMO) element array located at or near to an image plane of the imager, for providing a spectral signature for use with the focal plane array;
   an assembly wheel for positioning multiple MMO element arrays within the imager wherein selection of any one MMO element array provides differing spectral signatures from any other MMO element array of the assembly wheel; and
   a processor connected with the focal plane array for forming a hyperspectral data cube from the spectral signatures,
   wherein objects may be identified from the hyperspectral data cube.

14. The imager of claim 13, the MMO element array comprising cylindrical lens elements and prism elements to image the pupil and divide it into wavelengths.

15. A hyperspectral imaging system, comprising:
   imaging optics for forming an image of an object;
   a focal plane array for detecting spectral signatures;
   a slit array between the focal plane array and the imaging optics, the slit array selecting parts of the image as bars;
   a spectrometer for reimaging the bars as multiple spectral signatures onto the focal plane array, the spectrometer having:
      first optics for collimating electromagnetic energy of an object along an optical axis;
      a first prism for dispersing the electromagnetic energy;
      a second prism for redirecting the spectra of the first prism along the optical axis;
      second optics for focusing electromagnetic energy along the optical axis from the second prism and onto the focal plane array; and
   a processor connected with the focal plane array for faulting a hyperspectral data cube from the spectral signatures, wherein objects may be identified from the hyperspectral data cube, and wherein the imaging optics are moveable to define which parts of the image are fed as bars into the spectrometer.

16. A method for forming a dense hyperspectral data cube from a plurality of images, comprising:

sequentially capturing the plurality of images over a period;

sampling each of the plurality of images into multiple channels, each channel focused into a bar;

dispersing each bar to form a plurality of spectral signatures;

capturing the spectral signatures using a focal plane array; and converting the captured spectral signatures into a hyperspectral data cube;

wherein the determined field of view is based upon a velocity and height of the imaging device in relation to the imaged object.

17. The method of claim 16, the step of sequentially capturing the plurality of images comprising capturing each of the plurality of images based upon the determined field of view in relation to an object being imaged.

* * * * *